Nov. 23, 1926.

H. F. BENSON 1,608,158

ADJUSTABLE SHAFT MOUNTING

Original Filed Jan. 28, 1921

Inventor
Harry F. Benson
By his Attorneys
Philipp Sawyer Rice & Kenny

Patented Nov. 23, 1926.

1,608,158

UNITED STATES PATENT OFFICE.

HARRY F. BENSON, OF HOLYOKE, MASSACHUSETTS, ASSIGNOR TO WORTHINGTON PUMP AND MACHINERY CORPORATION, OF NEW YORK, N. Y., A CORPORATION OF VIRGINIA.

ADJUSTABLE SHAFT MOUNTING.

Original application filed January 28, 1921, Serial No. 440,605. Divided and this application filed July 15, 1924. Serial No. 726,095.

This invention relates to a driving head, especially for deep well pumps and the like wherein some provision must be made for vertical adjustment of the load carrying shaft, so that a proper running clearance may be obtained.

In heads of this kind it has been customary to suspend the vertical shaft from an adjusting nut threaded upon the upper end of the shaft and sustained on the driving head, an axially movable key securing the driving part of the said head in fixed rotating relation to the shaft while, at the same time permitting the aforesaid vertical adjusting movement.

However this known type of vertical adjustment for the shaft has the disadvantage that it is only the weight of the rotating parts that keeps the shaft from moving upward, a liability which occurs at times in various types of deep well pumps.

Therefore it is a feature of this invention to provide a driving head wherein the vertical shaft is adjustable axially in either an up or down direction but is positively held in any adjusted position against movement in either direction.

A further object resides in accomplishing the aforesaid adjustment and locking by screw and nut mechanism, and particularly with a differential screw and nut arrangement whereby very accurate adjustment may be secured without undue strain and friction on the adjusting parts.

For a full understanding of the invention, a detailed description of a construction embodying the invention in a preferred form will now be given in connection with the accompanying drawings forming a part of this specification, and the features forming the invention then specifically pointed out in the claims.

Figure 1:
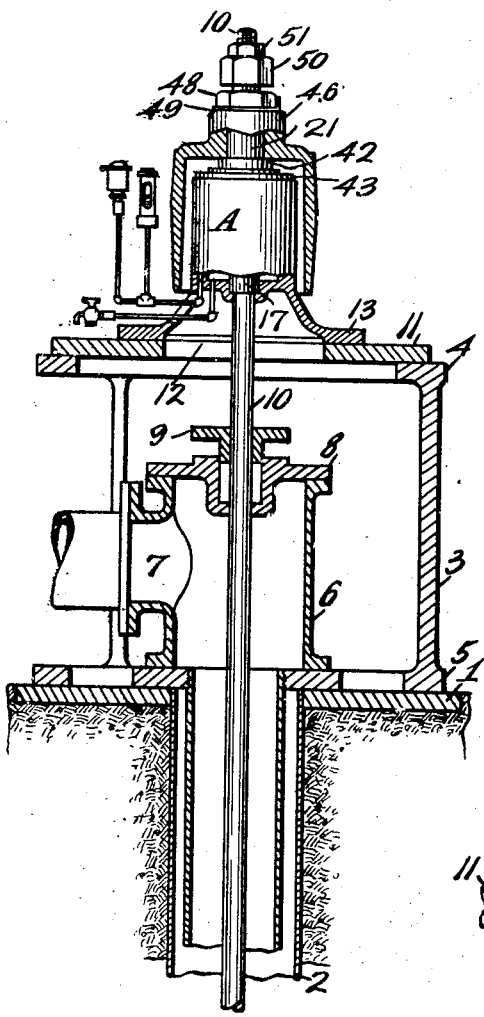
Figure 1 is a vertical section through a well head showing the shaft mounted in elevation.
Figure 2:
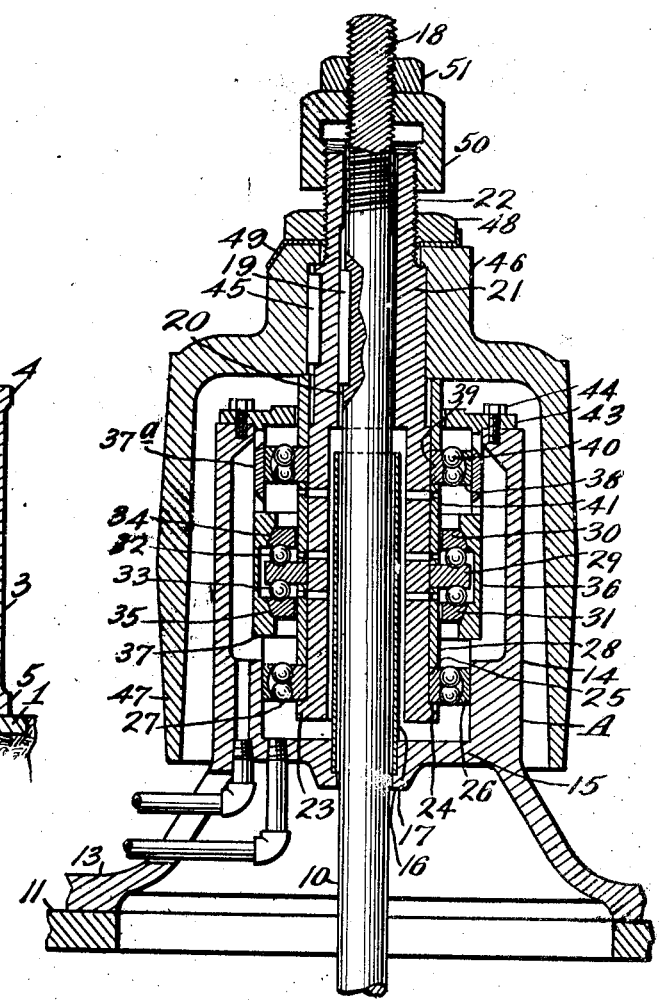
Figure 2 is a central sectional view of the driving head showing the shaft mounting in section.

Referring to the drawings; the construction shown is a deep well pump and includes a thrust bearing of my invention, with which the present invention is preferably combined, but the invention is applicable also to apparatus other than pumps and with shaft bearings of other suitable form.

In the construction shown, the well head is mounted on the usual foundation plate 1 receiving the upper end of the well casing 2 and mounting the frame 3, having the upper and lower bed plates 4 and 5, the lower bed plate 5 receiving the discharge T 6 having the outlet 7 and the head 8 of said T being provided with a stuffing box 9 through which the vertical shaft 10 extends.

On the upper bed plate 4 is a member 11 having an opening 12 through which the shaft 10 projects. The member 11 receives the base 13 of a load sustaining member A having the cylinderical side wall 14 closed at one end by the bottom 15 through the central boss 16 of which shaft 10 extends; a tube 17 is fitted in an oil-tight manner into the bottom 15 and surrounds the shaft 10 so that an annular lubricant reservoir is thus provided having outer and inner walls 14 and 17, respectively, clearance being allowed between the shaft 10 and the tube 17.

The upper end of the shaft 10 is threaded as shown at 18, and below this threaded portion is a key 19 which is engaged by the keyway 20 of a sleeve 21, the upper end 22 of which is also threaded but with finer threads than the portion 18 of the shaft 10; a hollow skirt 23, formed integral with the sleeve 21, telescopes over the tube 17 forming the inner wall of the lubricant reservoir and extends well down into the lubricant reservoir and, at its bottom, is provided with a shoulder 24. Slipped onto the sleeve 21 and resting on shoulder 24 is a ball race 25 which co-operates with a race 26 on the cylindrical side wall 14, and with the balls 27 between the races forms the lower radial bearings. Seating on the race 25 is a spacing sleeve 28 which fixes the position of an end thrust ring 29, said end thrust ring 29 co-operating with ball races 30 and 31 on each side thereof and with sets of balls 32 and 33 to form axial or end thrust bearings; said races 30 and 31 having spherical surfaces resting on oppositely disposed spherical seats 34 and 35 of a thrust cage 36 carried on a shoulder 37 in the cylindrical wall 14. On the upper side of the cage 36 is a ring 37ª carrying ball race 38 co-operating with ball race 39 and balls 40 to form the upper radial bearings; the ball race 39 being spaced from the race ring 29 by a sleeve 41. A sleeve 42 is placed against the race 39 and over this is the cover plate 43 held by bolts 44 and which rests against the ring 37ª to hold the ball race 38 and cage 36 in position.

Keyed to the upper end of the shaft 10, as at 45 is the hub 46 of a pulley 47 extending down over the lubricant reservoir and forming an enclosure therefor, the inner side of the hub 46 resting on the upper end of the sleeve 42 to hold the bearing races carried by the hollow sleeve 21 in position thereon, the pulley being held on the shaft 10 by a nut 48 screwed onto the upper end of the sleeve 21 and a lock washer 49.

The upper end 22 of the sleeve 21 carries a nut 50 also having threaded engagement with the threaded portion 18 of the shaft 10. The threads on the upper end 22 of sleeve 21 are finer than the threads on the shaft end 18 with the result that turning the nut 50 to the right or left raises or lowers the shaft 10 for adjustment. A jamb nut 51 retains the nut 50 in adjusted position.

It will be obvious that the side thrust of a belt driving the pulley 47 is absorbed by the upper and lower radial bearings, while end thrust on the shaft 10 is taken up by the two end thrust bearings, down thrust load being sustained by the thrust bearing cage 36 bearing on the shoulder 37 of the load sustaining member A while any upward thrust is taken care of against the cover plate 43.

In adjusting the shaft 10, the lock nut 51 is just backed away from the nut 50 after which turning of the nut 50 will adjust the shaft 10 up or down, as desired, by reason of the difference in the threads on the two parts 18 and 22; once the proper adjustment is secured the lock nut 51 is again screwed against nut 50.

It will be seen that my invention provides for adjusting the shaft with much less friction and wrench resistance than in previous constructions and that the shaft is held by the adjustment nut against movement in either axial direction, and thus forms a steadying means coacting with the thrust bearing to hold the shaft steady in adjusted position and thus secure the most efficient operation of the shaft driven mechanism.

This application is a division of application #440,605, filed Jan. 28, 1921 and now Patent #1,519,391.

What I claim is:

1. In a driving head for vertical load shafts, sustaining mechanism including a shaft receiving member supporting the shaft, a shaft in keyed rotating relation with said member but movable axially with respect thereto, and an adjusting member for the shaft secured to said mechanism against axial movement during operation of the pump and connected to the shaft for rotation therewith.

2. In a driving head for vertical load shafts, sustaining mechanism including a shaft receiving member supporting the shaft, a shaft in keyed rotating relation with said member but movable axially with respect thereto, and an adjusting member for raising or lowering the shaft in its receiving member connected to the shaft for rotation therewith and secured to said mechanism against axial movement during operation of the pump but adapted to be moved axially thereon when adjusting the shaft.

3. In a driving head for vertical load shafts, sustaining mechanism including a shaft receiving member supporting the shaft, a shaft in keyed rotating relation with said member but movable axially with respect thereto, and an adjusting member screw threaded to said mechanism, and to said shaft to vary the relation between the shaft and shaft receiving member axially.

4. In a driving head for vertical load shafts, sustaining mechanism including a shaft receiving member supporting the shaft, a shaft in keyed rotating relation with said member but movable axially with respect thereto, and an adjusting member screw threaded to said mechanism and to said shaft to vary the relation between the shaft and shaft receiving member, the threads between the shaft and adjusting member and the adjusting member and mechanism having a differential ratio whereby the shaft can be moved axially.

5. In a driving head for vertical load shafts, sustaining mechanism including a shaft receiving member supporting the shaft, a shaft in keyed rotating relation with said member but movable axially with respect thereto, and an adjusting member threaded to the sustaining mechanism with threads of one pitch and to the shaft with threads of another pitch to produce a differential adjusting movement of the shaft when the adjusting member is turned.

6. In a driving head for vertical load shafts, sustaining mechanism including a shaft-receiving member supporting the shaft, a shaft in keyed rotating relation with said member but movable axially with respect thereto, and an adjusting member threaded to the mechanism with threads of fine pitch and to the shaft with threads of coarse pitch to produce a differential adjusting movement of the shaft when the adjusting member is turned.

7. In a driving head for vertical shafts, the combination with a thrust bearing constructed to support upward or downward thrust, of a shaft-receiving member carried by said thrust bearing, a shaft in keyed rotating relation with said member but movable axially with respect thereto, and an adjusting member for raising or lowering the shaft in its receiving member secured to said member against axial movement during operation of the pump and connected to the shaft for rotation therewith.

8. In a driving head for vertical shafts, the combination with a thrust bearing constructed to support upward or downward thrust, of a shaft-receiving member carried by said thrust bearing, a shaft in keyed rotating relation with said member but movable axially with respect thereto, and an adjusting member screw threaded to said member and to said shaft to vary the relation between the shaft and shaft-receiving member, the threads between the shaft and adjusting member and the adjusting member and shaft-receiving member having a differential ratio whereby the shaft can be moved axially.

9. In a driving head for vertical shafts, the combination with a thrust bearing constructed to support upward or downward thrust, of a shaft-receiving member carried by said thrust bearing, a shaft in keyed rotating relation with said member but movable axially with respect thereto, and an adjusting member threaded to the member with threads of fine pitch and to the shaft with threads of coarse pitch to produce a differential adjusting movement of the shaft when the adjusting member is turned.

In testimony whereof, I have hereunto set my hand.

HARRY F. BENSON.